March 5, 1968  A. L. LIVSHITS ETAL  3,372,262
HYDROSOLENOID UNIT FOR ELECTROEROSION MACHINES
Filed April 24, 1964

3,372,262
HYDROSOLENOID UNIT FOR ELECTRO-
EROSION MACHINES
Abram Lazarevich Livshits, 5th V. Mikhailousky, 28, Apt. 9, and Vadim Evgenjevich Polotsky, Leninsky Prospect, 70/11, Apt. 238, both of Moscow, U.S.S.R.
Filed Apr. 24, 1964, Ser. No. 364,058
4 Claims. (Cl. 219—69)

ABSTRACT OF THE DISCLOSURE

A hydrosolenoid unit having a cylindrical housing containing a solenoid with a movable core having a vibration damping device including a rod connected to the core and supporting a plurality of removable discs of varied diameter for regulating vibration damping, the housing having upper and lower bellows secured on both end faces thereof, the lower bellows being rigidly connected at its lower end to the movable core.

---

The present invention relates to devices for electroerosion machining of metal ware, and more particularly, to units intended for adjusting the interelectrode gap and the range of feed of the electrode-tool of electroerosion machines.

The invention can be utilized in broaching holes and machining shaped cavities and the like.

There are known electroerosion machines with hydrosolenoid units for adjusting the range of feed of the electrodes.

These conventional units comprise preferably a cylindrical housing with an internal solenoid with a movable core. The main drawback of said units is in that performance depends on the weight of the electrode-tool and involves vibrations with a range exceeding the size of the interelectrode gap.

There are also known hydrosolenoid units with the electrode-tool feed by oil overflow from one chamber into another through an adjustable port. Satisfactory performance of such hydrosolenoid units is obtained when during operation they are kept in a vertical or nearly vertical position.

Vibration of moving parts of said units arising during operation results in considerable reduction of efficiency. In the conventional units, adjusting of the feed force is complicated and sealing of the inner chamber is unreliable.

The object of the present invention is to eliminate the above-mentioned drawbacks.

The principal object of the present invention is to develop a hydrosolenoid unit with reduced weight and overall dimensions as compared with known units, and which facilitates adjusting of the feed force, possesses a reliable sealing of its inner chamber and prevents rotational slippage of the electrode-tool holder while insuring vibrations in a range within the size of the interelectrode gap.

This problem is solved by using a hydrosolenoid unit for adjusting the interelectrode gap and the range feed of the electrode-tool, particularly, of electroerosion machines, said unit comprising a cylindrical housing with an internally installed solenoid with a movable core, and by using a bellows installed on both ends of the cylindrical housing, and a vibration damper, preferably of multidisc type, rigidly connected with the movable core of the solenoid.

The solenoid winding is switched in by means of a choke-coupled magnetic amplifier, which winding is connected to a ballast resistor directly or through a hum filter which increases the sensitivity of the unit.

It is advisable to provide the vibration damper with removable discs to set a determined degree of mechanical damping by modifying the diameter of the discs or, when necessary, to remove the vibration damper in entirety.

The proposed hydrosolenoid unit allows the developing of multispindle machines as well as ensures stable performance of electro-erosion machines, increased efficiency, simplified operation, and improved quality of machining.

An embodiment of the proposed invention is shown in the appended drawing, in which.

Figures 1, 2:
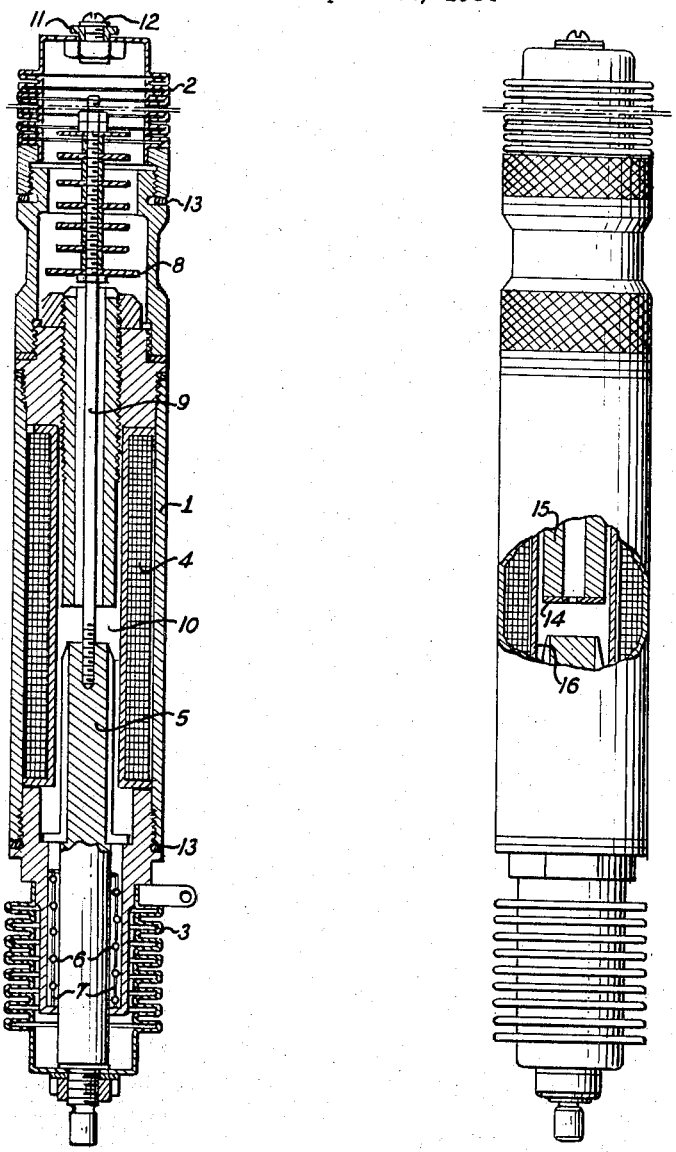
FIG. 1 is an axial section of a hydrosolenoid unit.
FIG. 2 is a side view of the hydrosolenoid unit in partial section.

According to the invention, the hydrosolenoid unit for electro-erosion machines consists of a cylindrical housing 1 with a working fluid e.g. oil, bellows 2 and 3, solenoid coil 4, movable core 5, guided in the head housing on balls 6 in cage 7. The hydrosolenoid unit is supplied with a multidisc vibration damper with removable discs 8 mounted on rod 9, said damper being rigidly connected to the movable core 5 of the solenoid.

The discs 8 are of varied diameters to regulate the vibration damping range.

When the electroerosion machine operates, feed of the electrode-tool connected to the movable core 5 is obtained by the elastic forces of bellows 2 and 3. To regulate said feed, the fluid pressure is changed inside chamber 10 by modification of the preliminary tension of the bellows. To increase said tension, upper bellows 2 with the port 11 open is extended and then closed by means of plug 12. To reduce said tension, the bellows 2 is compressed before closing the port 11 and excessive oil drained off. When a short circuit occurs, the electrode-tool is drawn off a workpiece under the retraction action of the core 5 inside the solenoid coil 4. Vibration arising during the short circuit is damped by means of the disc arrangement 8. Gaskets 13 ensure sealing of the inner chamber of the unit. Vibration can also be damped by a diaphragm brake 14 (FIG. 2) located inside a magnetic sleeve 15, the latter increasing the retracting force of solenoid 16.

Figure 3:
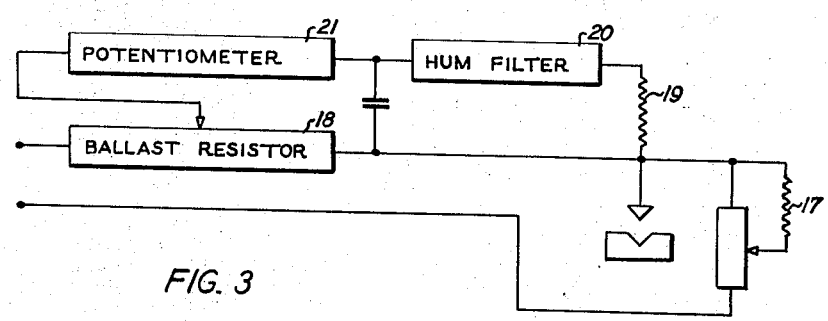
FIG. 3 is a schematic circuit diagram showing the power supply to the unit.

Current to solenoid winding 17 (FIG. 3) is supplied from ballast resistor 18 through a choke-coupled magnetic amplifier with a control winding 19. The control winding 19 of the choke-coupled magnetic amplifier is provided with a hum filter 20, preferably of $R_c$ type which reduces vibration and increases regulation stability. The required rate of feed is set by means of potentiometer 21 connected to the control winding 19.

What is claimed:

1. A hydrosolenoid unit comprising a cylindrical housing having opposite end faces and adapted for containing a working fluid, a solenoid with a movable core installed in said housing, an upper and a lower elastic bellows secured to both end faces of said cylindrical housing, the lower bellows being rigidly connected adjacent its lower end to the movable core for retracting said core upon short circuiting, means located in said housing and associated with the core for acting on the fluid for damping vibration of said core, and means for adjusting the tension in the bellows to regulate the feed range of the core.

2. A unit as claimed in claim 1 wherein said means for damping vibration of the core comprises a plurality of removable discs coupled to the core for movement with the core.

3. A unit as claimed in claim 1 wherein said discs are of varied diameters.

4. A unit as claimed in claim 1 wherein said means for adjusting the tension in the bellows includes a closable port in said upper bellows, said upper bellows being extendable and retractable with said port open.

References Cited

UNITED STATES PATENTS

| | | | |
|---|---|---|---|
| 1,728,135 | 9/1929 | Pillion | 310—19 X |
| 2,622,179 | 12/1952 | Butterfield | 219—98 |
| 2,654,256 | 10/1953 | McKechnie | 219—69 X |
| 3,123,728 | 3/1964 | Kreiskorte | 310—19 |
| 3,134,011 | 5/1964 | De Bruyn | 219—69 |

RICHARD M. WOOD, *Primary Examiner.*

R. F. STAUBLY, *Assistant Examiner.*